Oct. 4, 1966          J. L. BUCKMASTER ETAL          3,276,311
       OPTICAL PLUMBING DEVICE FOR ESTABLISHING FROM AN AERIAL
              LOCATION THE POSITION OF A MARK ON THE GROUND
Filed Dec. 4, 1962                                    5 Sheets-Sheet 1

INVENTORS
JAMES L. BUCKMASTER
HUGH B. LOVING

BY Ernest S. Cohen
   Gersten Sadowsky
              ATTORNEYS

Oct. 4, 1966   J. L. BUCKMASTER ETAL   3,276,311
OPTICAL PLUMBING DEVICE FOR ESTABLISHING FROM AN AERIAL
LOCATION THE POSITION OF A MARK ON THE GROUND
Filed Dec. 4, 1962                           5 Sheets-Sheet 4
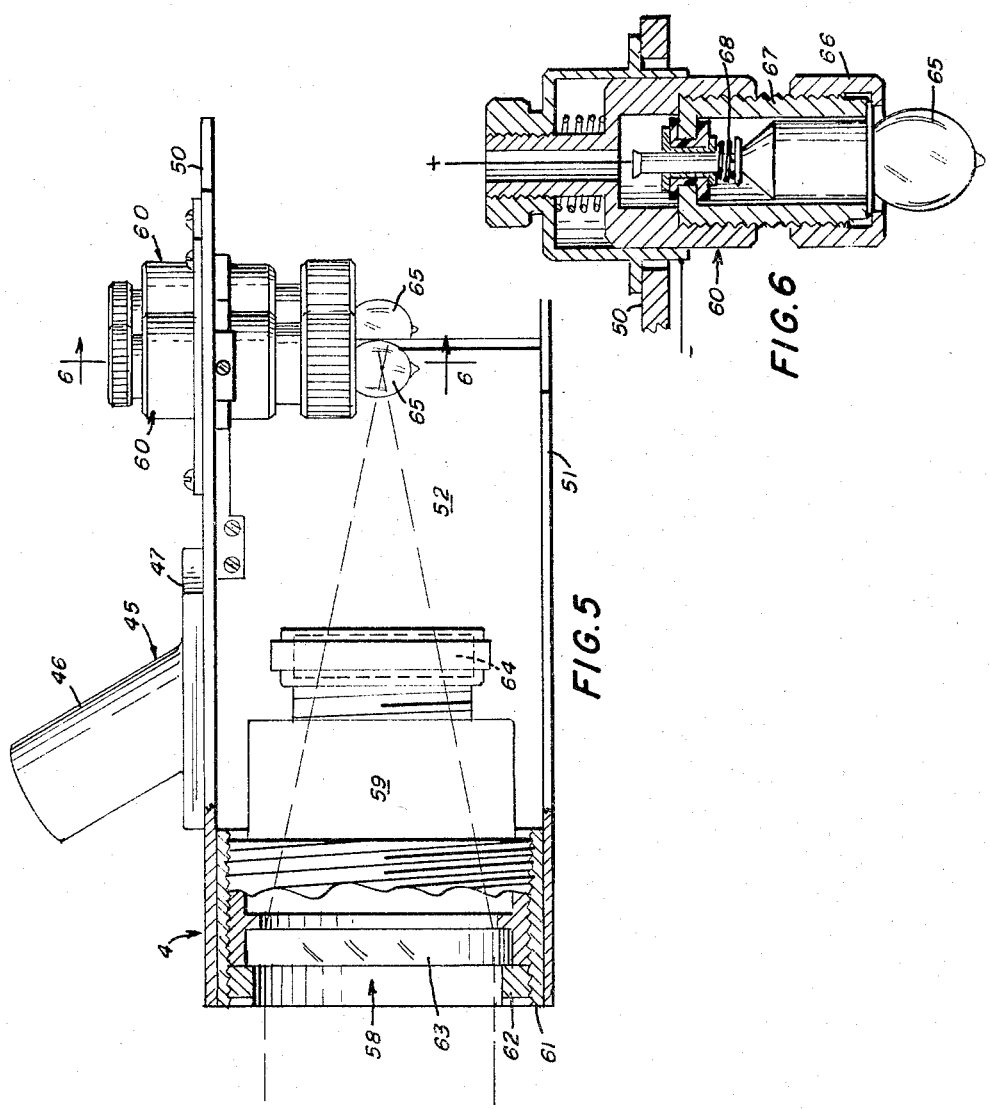
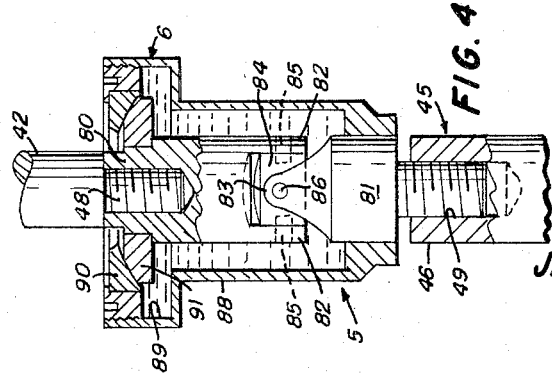
INVENTORS
JAMES L. BUCKMASTER
HUGH B. LOVING
BY Ernest J. Cohen
   Gersten Sadowsky
            ATTORNEYS

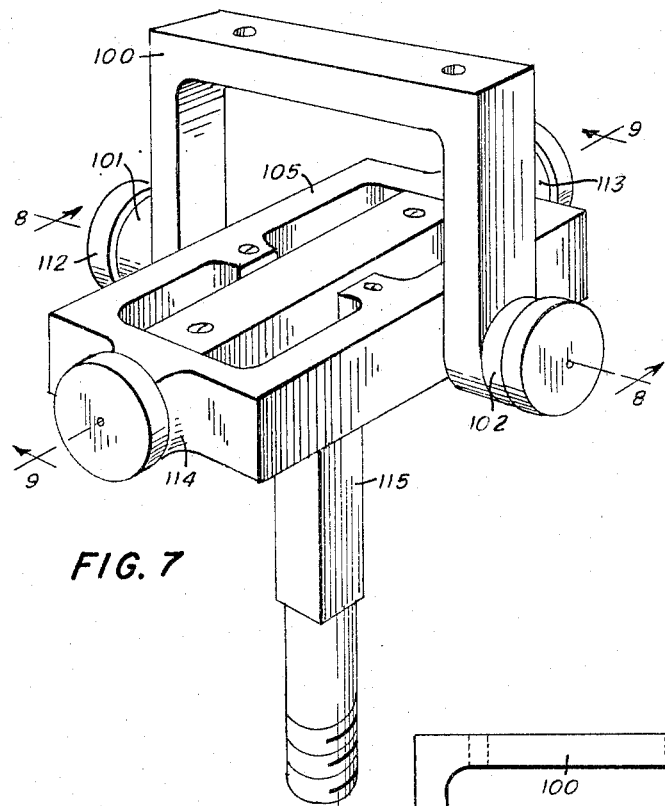
FIG. 7
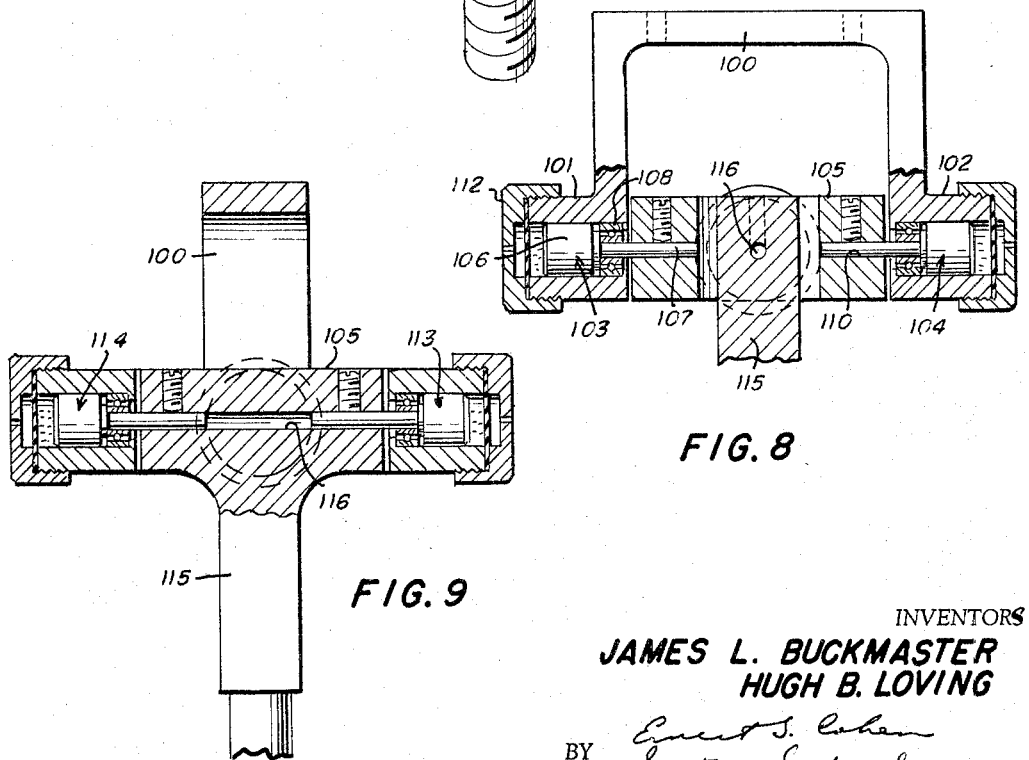
FIG. 8
FIG. 9
INVENTORS
**JAMES L. BUCKMASTER
HUGH B. LOVING**
BY *Ernest J. Cohen*
*Gersten Sadowsky*
ATTORNEYS United States Patent Office 3,276,311
Patented Oct. 4, 1966

3,276,311
OPTICAL PLUMBING DEVICE FOR ESTABLISHING FROM AN AERIAL LOCATION THE POSITION OF A MARK ON THE GROUND
James L. Buckmaster, Arlington, and Hugh B. Loving, Falls Church, Va., assignors to the United States of America as represented by the Secretary of the Interior
Filed Dec. 4, 1962, Ser. No. 242,334
4 Claims. (Cl. 88—2.2)

The invention herein described and claimed may be manufactured and used by or for the Government of the United States of America for governmental purposes without the payment of royalties thereon or therefor.

The hoversight of this invention relates to an optical plumbing device having particular utility as an aid in establishing from an aerial location, the position of a mark or target on the ground corresponding to a control point in a long range survey operation. A helicopter which may be used in the survey operation, is maneuvered to hover directly over the ground target whereby this craft is enabled to function as a survey station. It then serves as a target for distant sighting instruments, and as a platform on which are located instruments to measure the distance from the helicopter to the ground mark, and to at least two remote ground control stations whose geodetic positions are known. The relative angular disposition of the helicopter in the survey may also be determined by using theodolites at the remote stations, sighted upon the target effected by the helicopter such as by means of a signal beacon attached to it. In this manner distance and directional data is attained with which the position of the control point marked on the ground may be determined by applying the acquired data to the solution of well known trigonometric relationships. However, as indicated, all operations of the distance and angle measuring instruments in connection with the helicopter, presupposes that the helicopter is hovering in an accurate vertical alignment over the ground target. To facilitate a flight control for this helicopter that is propitious to the operation of its surveying instruments, the optical device according to the hoversight, provides at the same time, to the pilot and an observer nearby who may operate the surveying instruments, a view of the ground mark in association with an illuminated reticle means suspended as a pendulum in the optical device. By observing in the hoversight the relative displacements between the reticle and the image of the ground target, the helicopter pilot may suitably maneuver the craft to cause the reticle to continually return to centrally overlie the ground mark image whereby the craft is maintained in a close vertical alignment over the ground mark. When this steady vertical alignment is thereby simultaneously indicated to the observer and instrument operator also viewing the hoversight, the distance measuring instruments are then made operative to gather the necessary data.

A principal object of the present invention is therefore to provide a device for ascertaining the relative vertical linearity between an elevated station and the nadir thereof on a surface below.

Another object of the present invention is to provide for use in a helicopter, an optical sighting device operative to indicate at the same time to the helicopter pilot, and to an observer in the craft, the vertical position of the helicopter relative to a point marked on the ground.

A further object of the present invention is to provide an optical sighting device which presents a stereoscopic view of a mark on a surface below the device, in relation to a reticle means in the device, whose vertical position is adjustably set by the effect of gravity.

These and other objects and advantages of the invention will be more clearly understood from the following description of a preferred embodiment of the invention, considered together with the accompanying drawing wherein:

FIG. 4 is a sectional view of a first modification of a damped flexible coupling for operatively associating the sighting and light reticle producing structures of the optical device;

FIG. 5 is a side elevational view of the light reticle producing structure, showing in a partial section a light projector means thereof;

FIG. 6 is a sectional view of the light reticle lampbulb socket and elements mounting the socket in a light projector housing;

FIG. 7 is a perspective view of a second modification of the damped coupling of the invention;

FIG. 8 is a view partly in cross-section taken along the line 8—8 in FIG. 7; and FIG. 9 is a view like FIG. 8 and taken along the line 9—9 of FIG. 7.

Figure 1:
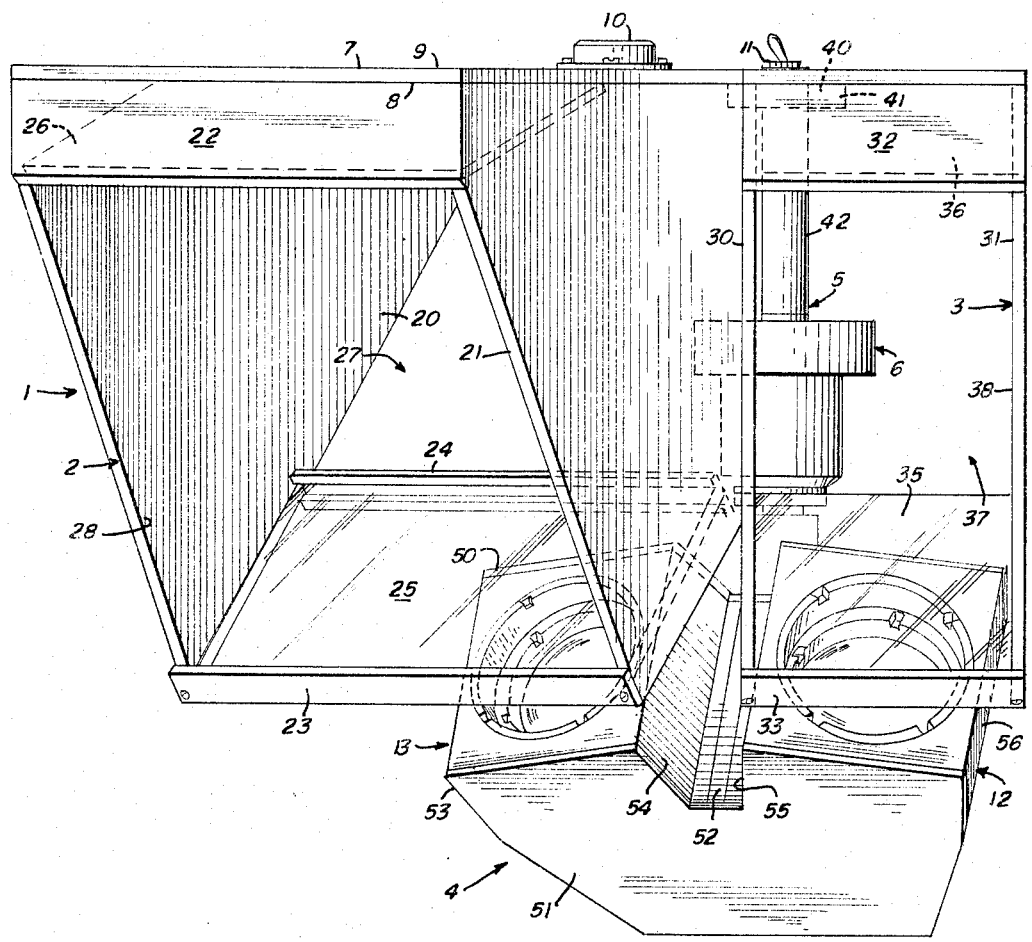
FIG. 1 is a front elevational view of the assembled optical device according to the invention.
Figure 2:
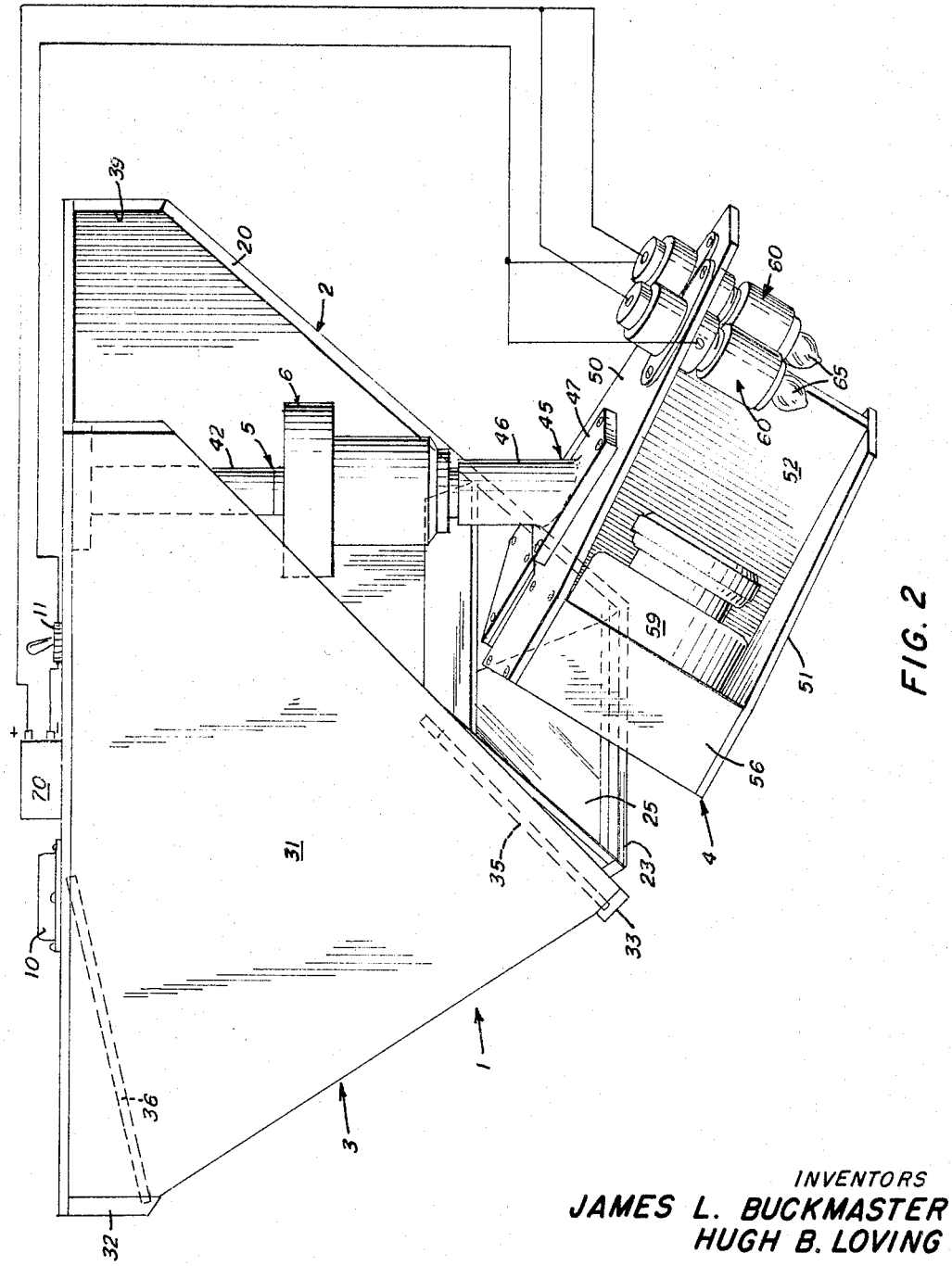
FIG. 2 is a side elevational view of the showing in FIG. 1.
Figure 3:
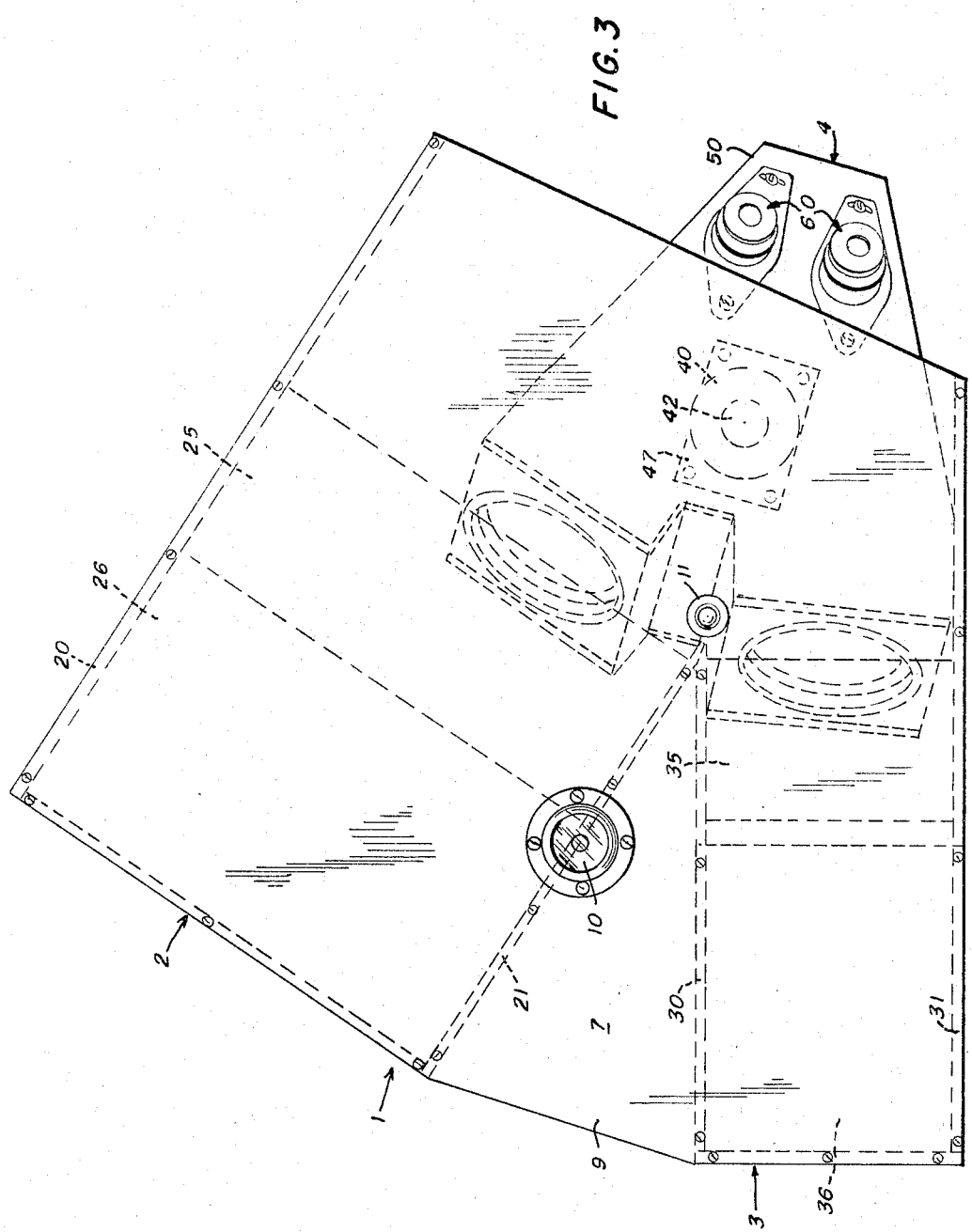
FIG. 3 is a top plan view of the optical device.

Referring to FIGS. 1, 2 and 3 of the drawings, the general arrangement of the optical device according to the invention, is seen to comprise a canopy-like structure 1, including a pair of hood-like enclosures 2 and 3, and a light collimator assembly including a housing 4, suspended from the canopy structure by means of a flexible connector 5, including a damping coupling mechanism 6. An extended upper covering for the canopy 1, is fashioned as a polygonal plate 7 of light metal such as aluminum, and this plate constitutes a basic support for the various interrelated parts of optical device. Enclosures 2 and 3, as well as the flexible connector 5, are attached to an under surface 8 of the cover plate, and by means of screws fastened in a top surface 9 of the plate, the optical device may be suitably fixed in an operative position on a horizontal beam or other structural member inside the helicopter. Also fastened in the top surface 9 of the cover plate, are a bull's-eye spirit level 10, and a on-off electrical switch 11, whose functions will be hereinafter more fully explained.

Each of the hood-like enclosures 2 and 3 may be constructed to have substantially the same form, although in the preferred embodiment, the enclosure 2 is made about twice the width of enclosure 3. The several polygonal plate-like panels 20, 21, 22, 23 and 24 of light metal, constituting the enclosure 2, are fastened to one another and to cover plate surface 8, by ordinary fillet head machine screws, to obtain the hood-like form best shown in FIG. 1. Enclosure 2 is fashioned to provide a shielding cover for a semitransparent mirror 25, and an opaque mirror 26, having surfaces facing the extended rectangular openings 27 and 28 in the enclosure's rear and forward portions, respectively. Opposite edges on mirror 25 are received by appropriate slots in the plates 23 and 24, and the mirror is secured thereby between the parallel plates 20 and 21, in the lower portion of the rear opening 27 which extends upwardly toward the rear of the enclosure 2, as best seen in FIG. 1. Arranged thusly, mirror 25 is located in a plane intersecting the surface of the cover plate 7, at an angle of about 45 degrees. Correspondingly, the enclosure's frontal plate 22, provides in an inside surface, an appropriate slot to receive an edge of opaque mirror 26, the opposite edge of which is fastened to surface 8 of the cover plate, by epoxy resin glue or other like cement. By this means, the mirror 26 is fixed inclined rearwardly between the parallel plates 20 and 21, and facing downward toward the enclosure's forward opening 28, with its reflective silvered surface in a plane making a 30 degree angle with the plane defined by the reflective silvered surface of semitransparent mirror 25. As best illustrated by the showing in FIG. 3, the mirror 26 is located forward of the semitransparent mirror 25 such that the rear edge of the former is aligned approximately over the leading edge of the latter. Arranged in this manner, these mirrors are operatively effective to form a system of reflective surfaces such as would be made available by the use of a sixty degree penta prism.

In a like manner enclosure 3 is composed of several polygonal panel-like plates 30, 31, 32 and 33 of light metal, which are fastened to one another and to cover plate surface 8, by ordinary fillet head machine screws, to obtain the hood-like form best shown in FIG. 2. Within the shielding cover of enclosure 3, there are set in place a semitransparent mirror 35, and an opaque mirror 36, having surfaces facing the extended rectangular openings 37 and 38 in the rear and forward portions of enclosure 3, respectively. Opposite side edges, and a front edge of mirror 35, are received by appropriate slots in plates 30, 31 and 33, and the mirror is secured thereby between the parallel side panel plates 30 and 31, in the lower portion of the rear opening 37 which extends upwardly and toward the rear in the enclosure as seen in FIG. 2. Arranged thusly, mirror 35 is located in a plane intersecting the surface of the cover plate 7, at an angle of about 45 degrees. Like the first mentioned opaque mirror, the mirror 36 is held by a slot in the front plate 32, and fastened by a resin glue to the surface 8 of the cover plate. Mirror 36 is thereby set to be also inclined rearwardly between the side panel plates 30 and 31, and facing downward toward the enclosure's forward opening 38, with its silvered surface in a plane at a 30 degree angle with the plane defined by the reflective surface of semitransparent mirror 35. Like its corresponding part in enclosure 2, the mirror 36 is located to align its rear edge approximately over the leading edge of mirror 35, in a manner most clearly shown by FIG. 2.

Frontal openings 28 and 38 of the enclosures 2 and 3 respectively, are angularly related such that the entirety of the view presented therein may be conveniently seen at separated stations in the helicopter. As shown in FIG. 3, cover-plate 7 is suitably shaped to accommodate the angled enclosures 2 and 3, whereby their respective inner side plates 21 and 30 converge at an angle of about 30 degrees to contact at a point under the cover plate. The respective outer side plates 20 and 31 similarly converge to define a relatively wide opening 39 across the back end of the canopy structure 1. At a short distance from the opening 39, and substantially in line with a line bisecting the angle between the inner side plates 21 and 30, there is attached to the undersurface 8 of the cover plate, a hanger bracket 40 of the coupling assembly 5. Screws through a flange 41 of the bracket fasten it to the cover plate such that a cylindrical post 42 thereof extends downward between the rear openings 27 and 37 of the enclosures. Suspended from the post 42 by means of a connection including damping coupling 6, is a second hanger bracket 45 to which is attached the collimator housing 4. Accurate alignment of the suspended structure when assembled to the cover-plate 7, can be facilitated by forming the screw holes in the post flange 41, as peripheral, arcuately slotted holes whereby the post is allowed a degree of rotational adjustment relative to the cover-plate.

Comprising the assembly within housing 4 are dual light collimator arrangements 12 and 13, each of which includes components to produce a reticle light, and to project such light. Referring particularly to FIG. 5, the housing 4 is shown to comprise a top cover plate 50 to which is attached the structure supporting and shielding the light collimator arrangements. A base plate 51 of the housing, is maintained separated from top plate 50, and parallel thereto, by a medial plate 52 set upright between plates 50 and 51, and fastened thereto by fillet head screws. Plates 50 and 51 are of similar contour, and are aligned one above the other with the rear edge of plate 50 extending beyond the base plate to provide sufficient surface to support the light producing components fixed therein. As best seen in FIG. 1, bifurcated front portions of plates 50 and 51 have located between their edges upright, parallel rectangular plates 53, 54, 55 and 56, forming thereby framing enclosures in which lens components of the light projectors are supported.

Details of the light collimator arrangement are shown in FIGS. 5 and 6, to include a projector system 58 comprising an adjustable lens barrel 59, and a light socket element 60. Properly locating the projector system 58 within the housing 4, is a relatively thick collar-like lens retainer 61, which fits snugly within the framing enclosure at the front of the housing. A circular opening in the lens retainer 61, is provided with internal threads on which is screwed a cylindrical lock ring 62 which is provided to maintain the lens barrel 59 in adjusted position within the retainer. Arranged within the lens barrel is a lens system including lenses 63 and 64, with which focussing is accomplished by turning the lens barrel along the threads of the retainer as required, and locking it therein with ring 62. Within the focal range of the lens 64, is located a pre-focus lamp bulb 65 secured within mounting 60. Lamp 65 is held by a retaining collar 66 which screws upon the lower end of a threaded sleeve 67 in which the base of the bulb is caused to contact a terminal pin 68. Threads on the opposite end of sleeve 67, engage within a receptacle bracket 69 fastening the socket element to housing cover plate 50. On the other side of medial plate 52, light collimator arrangement 13 comprises components identical to those previously described for arrangement 12. Provided to energize the lamps of the arrangement, is a conventional D.-C. circuit. Attached to surface 9 of the canopy cover plate, is a battery casing 70 containing several dry cell batteries, which has one pole terminal electrically connected to one terminal of switch 11, and to its other pole terminal, and to the other terminal of switch 11, are connected in a parallel circuit, the filaments of the two light reticle producing bulbs.

Light collimator arrangements 12 and 13 function to project the images of their lighted filaments through the surfaces of the unsilvered sides of the semitransparent mirrors 35 and 25, respectively, whereby these filaments would normally appear as reticles at an infinite distance. However, by proper focussing of the lens barrels 59, the filament images can be made to appear as being at a finite distance such as one hundred feet, in order to minimize parallax between the ground image and the light filament images. Moreover, housing 4 comprising these arrangements, is suitably located relative to the enclosures 2 and 3, so that it will continue to direct the light projectors therein to produce a reticle image through mirrors 25 and 35, when the housing 4 is subjected to a limited range of displacements in coordinate directions. To facilitate this cooperation, the hanger bracket 45 is appropriately fastened to the cover plate 50 of housing 4, in alignment with the edge of medial plate 52, and is formed with a cylindrical post 46 that is forwardly inclined by about 60 degrees with its attaching flange 47.

Protruding from the flexible connector 5, at its top and bottom, as shown by the detailed view thereof in FIG. 4, are stems 80 and 81, respectively, which fasten together with a threaded rod 48 extending out of the upper hanger post 42, and in a threaded hole 49 of the inclined hanger port 45. Stems 80 and 81 are connected together for relative movement by a two part articulated joint within the damping coupling 6. This joint is formed by linking sets of bifurcated arms 82 and 83, on the inner ends of stems 80 and 81, respectively. A pivotal bearing block 84 is mounted for limited rotative movement about the axis of a bearing pin 85, passing through the block and arms 82. A similar bearing means 86 joins the block 84 and arms 83, so that the stem 81 may have limited rotative movement about an axis crossing the axis of the pin 85, at right angles. Around this jointure having limited movements in coordinate directions, in a casing 88 having one end closed tightly about the stem 81, and extending upward to form a tank having at its opposite end a relatively wide cylindrical opening 89. Within the opening 89 is fitted a spherical bearing element 90, the inner face of which is partly dished out to form a concave surface around a central opening therein. Fitted upon a reduced rim of stem 80 is the bearing element 91 having a convex surface conforming to the contour of the concave portion of element 90. The central opening of the bearing element 90 is partially filled by the extended portion of stem 80 passing therethrough, whereby this opening is effectively sealed by the snug fitting sliding contact between the concave and convex surfaces of the spherical bearing elements. However, prior to securing the bearing element 90 in place on a peripheral seat within opening 89, the tank of casing 88 is filled with a silicone oil. It is evident from the construction described, that when stem 80 is suitably centered in the opening of bearing element 90, it may be pivoted in any one of four directions by a displacement of the canopy cover plate 7 connected thereto. Such pivotal movement will be followed directly by further relative displacement of the stem 81 and casing 88 fixed thereto, by reason of the gravity effect on the housing 4 and its contents. Furthermore, all relative movements at the coupling are effected gradually due to the damping action of the silicone oil in the tank of casing 88, and erratic movements imposed upon the canopy structure 1, will be absorbed thereby.

In the modified form of the damped articulated connector shown in FIGS. 7, 8 and 9, a yoke-like hanger 100, has as an integral part thereof, two separate bearing tanks 101 and 102, one tank extending outward from the end of each upright portion of the element. Supported between these upright portions, on bearing arrangements 103 and 104 which are operable within the bearing tanks 101 and 102, is a gimbal frame 105. In each of the tanks, the bearing arrangement comprises a piston-like structure such as element 106 in tank 101, having fitted on the head end of its stem, a seal ball bearing 108 which supports the piston element 106 for rotation within the tank 101. The extension of piston stem 107 is received in a hole 110 through one side of gimbal frame 105, and secured therein by a set screw. Silicone oil introduced around the piston 106 and its ball bearing fills the tank 101, which is sealed by a membrane gasket and cap 112 screwed on the threaded outer surface of the bearing tank. An identical piston and ball bearing structure comprises the bearing arrangement 104 which supports the other side of the gimbal frame 105 for rotative movement relative to the hanger element 100.

Integral with, and extending out from the unsupported sides of the gimbal frame 105, are two further bearing arrangements 113 and 114 between which is supported a T-shaped pendulum hanger 115. Comprising each of the bearing arrangements 113 and 114, is also a piston-like bearing element rotatably supported in a tank of silicone oil, sealed by a seal ball bearing and a gasket cap structure. Piston stems extending from the bearing arrangements 113 and 114, are received in a hole 116 passing axially through the horizontal portion of hanger 115, and are secured therein by set screws. Like the first mentioned flexible coupling, that shown in FIGS. 7, 8 and 9, is applied in the present invention to support the light collimator housing 4 for limited swaying movements relative to canopy structure 1. To this end, the horizontal bar of the hanger 100 is fastened to the under surface 8 of the canopy cover plate by means of screws or the like, and the threaded hole in the post of hanger 45, has screwed therein the threaded end of the vertical portion of the pendulum structure 115. Gradual relative movements between the canopy and housing in coordinate directions is achieved by reason of the crossed axis passing through the bearing arrangements 103, 104, and 113, 114 and the damping effects of the silicone oil in the sealed bearing tanks of these arrangements.

To operatively position the optical hoversight of the invention, within the helicopter, requires that the hoversight be located ahead of and to one side of the pilot whereby the pilot looking forward may view the wide semitransparent mirror 25, within a sight span which is not higher than the horizon, nor lower than 45 degrees below the horizon. When so arranged, the helicopter pilot may view the hoversight, and yet have use of peripheral vision to maintain the stability of the craft necessary for good hovering. Also of importance to the installation of the hoversight, is that it be accurately level relative to the horizontal structure of the helicopter in level flight. For this purpose, the bull's-eye level 10 is utilized in a conventional manner.

When made operative in the helicopter, the hoversight becomes the key unit of the equipment for the aerial surveying procedure. As noted previously in explaining this aerial surveying procedure, the helicopter's alignment over the ground target must be very nearly perfect in order to establish a highly accurate horizontal control for the survey. Hovering at a selected height between, for example, 50 to 250 feet above the ground, the helicopter is brought around such that the pilot may see with both eyes, a stereoscopic view of the ground target image received up through the transparent outer covering of the helicopter cockpit, and the opening 28 of the hoversight enclosure 2. This image is reflected from the wide surface of mirror 26 facing the opening 28, to the reflective surface of the semi-transparent mirror 25 through which the target image is combined with the reticle image projected by collimator arrangement 13. An almost identical view of the superimposed target and reticle images appears through mirror 35 in the enclosure 3, the opening 38 of which looks down at the ground target mark, and the opening 37 of which receives a reticle image projected from collimator arrangement 12. The observer positioned nearby the pilot, faces enclosure 3, and may view these images through the semitransparent mirror 35. When the helicopter's vertical alignment over the ground target is verified by the views presented through mirrors 25 and 35, the observer proceeds to obtain the distance measurements to the ground and to the remote control stations. An electronic instrument system found appropriate for measuring the distances to the remote stations, provides for having aboard the helicopter, a slave or remote unit hydrodist made operative with a master unit located at each of the remote stations. The hydrodist is essentially a tellurometer using a cathode ray tube graduated for distance indications. Distance to the ground may be measured by a range finder, altimeter, or a weighted line carried on a graduated drum in the helicopter.

While a preferred embodiment of the invention has been illustrated and described herein, it is to be understood that the invention it not limited thereby, but is susceptible to changes in form and detail.

What is claimed is:

1. An optical plumbing device comprising a coverture structure formed by a plurality of hoods under a canopy, each hood having a front and rear opening and being spaced and arranged with respect to one another and said canopy so that the hood provides an optical representation for anyone looking along a line of sight directed at its front opening, individual image producing light means separately related to each hood and operative to produce a collimated light beam, and a connector pendulously suspending said light means from a rear portion of said coverture structure for limited, damped movement relative thereto in perpendicular directions whereby said light beams are directed at said rear openings in said hoods, an opaque mirror fixed in an upper portion of said front opening of each hood, and a semitransparent mirror fixed in a lower portion of said rear opening of each hood having on its obverse side a partially reflective first surface substantially facing a fully reflective surface of said opaque mirror, and on its reverse side a second surface substantially facing said image producing light means corresponding thereto, each said image producing light means comprising a lamp element connected to an energizing source therefor, and a lens system for projecting in said collimated beam of light an image of said lamp element through said second and first surfaces of said semitransparent mirror corresponding thereto, said front opening of each hood providing for an unobstructed light path from directly below the device to said reflective surface of said opaque mirror whereby a scene on said light path is reflected from said opaque mirror on to said partially reflective first surface of said semitransparent mirror and reflected therefrom on said line of sight whereby said scene is viewable therealong stereoscopically with said lamp element image superimposed thereon in each hood.

2. The optical plumbing device of claim 1 wherein said connector comprises a damping coupling mechanism having first and second pivotal elements separately connected to the coverture structure and to the light means, respectively, said pivotal elements being operable in a damping fluid contained within said coupling mechanism, said light means comprising a housing in which said lens systems and lamp elements are supported in operative position, means on said housing connecting the light means to one end of said second pivotal element, said second pivotal element having fixed to its other end a cup-like casing containing said damping fluid and a spherical bearing structure constituted by concave and convex parts separately secured to said casing and said first pivotal element, respectively, said parts having mating spherical surfaces contiguously disposed to slide with respect to each other within predetermined limits so as to operatively relate said casing to said first pivotal element, whereby said operability of said pivotal elements is effected through said parts, said casing and the damping fluid comprising said coupling mechanism.

3. The optical plumbing device of claim 1 wherein said light means comprises a housing in which said lens systems and lamp elements are supported in operative position and said connector comprises a damping coupling mechanism having a hanger element and means fixing said hanger element to said coverture structure, a pendulum hanger and means fixing said pendulum hanger to said light means by a connection to said housing, and individual pivotal connectors including a gimbal frame, said hanger element and gimbal frame each having integral portions thereof which project therefrom to form enclosure components symmetrically arranged thereon, a pair of pivotal elements fixed oppositely disposed on said gimbal frame and fitted into portions of said enclosure components of said hanger element, and a further pair of pivotal elements fixed oppositely disposed on said pendulum hanger and fitted into portions of said enclosure components of said gimbal frame, and damping fluid filling the remainder of each of said enclosure components whereby said pivotal elements are angularly displaceable through said damping fluid within said enclosure components.

4. The optical plumbing device of claim 1, wherein the coverture structure comprises two hoods angularly disposed to each other under the canopy, and said light means comprising a housing in which two lens systems are correspondingly angularly disposed.

References Cited by the Examiner

UNITED STATES PATENTS

| | | | |
|---|---|---|---|
| 1,360,735 | 11/1920 | Mazuel | 88—1 |
| 1,891,641 | 12/1932 | Habel | 88—1 |
| 2,377,064 | 9/1942 | Aufiero | 88—2.3 |
| 2,399,014 | 4/1946 | Foster | 88—1 |
| 2,725,781 | 12/1955 | Banker | 88—2.3 |

FOREIGN PATENTS

| | | |
|---|---|---|
| 29,669 | 1912 | Great Britain. |
| 403,141 | 9/1924 | Germany. |

JEWELL H. PEDERSEN, *Primary Examiner.*

DAVID H. RUBIN, *Examiner.*

O. B. CHEW, *Assistant Examiner.*